Oct. 26, 1943.                G. R. KELM                2,332,646
                        GROOVE CUTTING MACHINE
                          Filed June 16, 1942

INVENTOR,
Gustav R. Kelm,
BY
John Stewart
ATTORNEY.

Patented Oct. 26, 1943

2,332,646

UNITED STATES PATENT OFFICE 2,332,646

GROOVE CUTTING MACHINE

Gustav R. Kelm, Paterson, N. J.

Application June 16, 1942, Serial No. 447,237

3 Claims. (Cl. 90—16)

A well-known type of milling machine includes, projecting from the frame proper of the machine and over the usual rotary work-supporting turret mounted on the upper one of two beds or tables horizontally adjustable independently but in rectilinear paths crossing each other at right angles, an arm having a depending shank in which is supported some rotary cutter rotated by a horizontal spindle paralleling and below the arm and suitably driven by means within the frame.

The further object is so to construct the said machine that groove-cutting may be effected in work whose surface to be grooved is arranged either horizontally and facing said arm or at any selected angular relation to the horizontal.

1 is the mentioned arm projecting horizontally from the frame proper 2 and forming therewith the frame of the machine. Under the arm will be the usual work-supporting means, not shown, including a turret rotative in a horizontal plane and having means by which to affix thereto the work and superposed beds or tables on the upper one of which the turret is rotative and which are respectively provided with means for adjusting them in horizontal planes and in crossing paths. 3 is the depending shank fixed to said arm. The arm is adjustable in the frame proper, and the shank on the arm, lengthwise of the latter, as usual. 4 is the rotative spindle arranged under the arm and parallel with the arm and extending from and adapted to be driven as usual by suitable means in the frame proper.

Figures 1, 2:
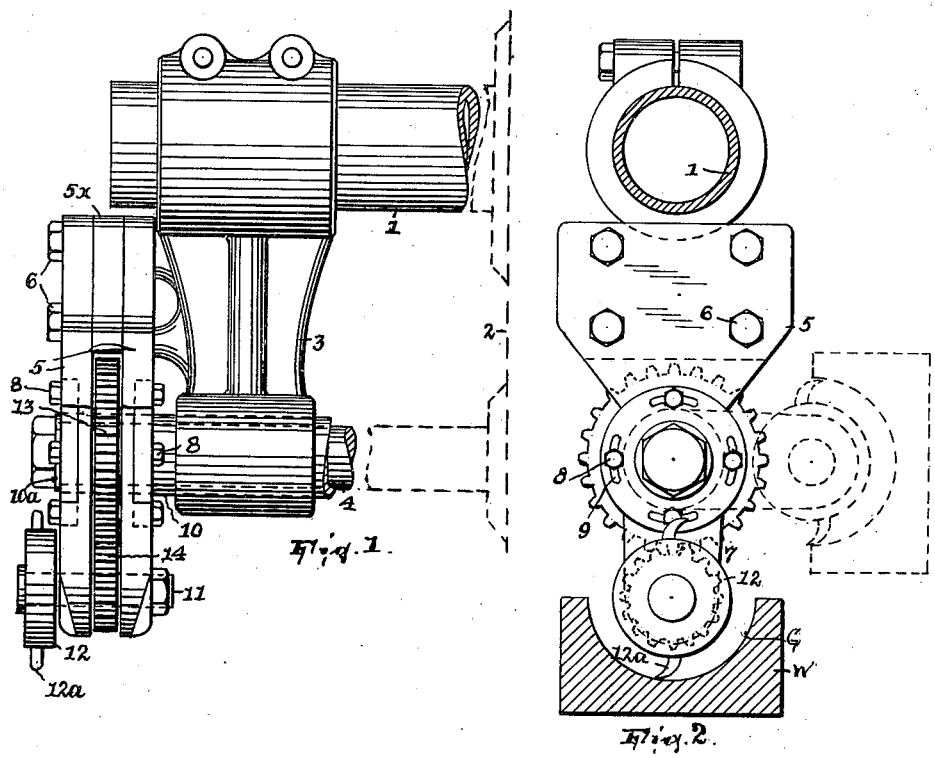
Fig. 1 is a side elevation of so much of the improved milling machine as is here material.
Fig. 2 is an elevation of what is shown in Fig. 1, as seen from the left.
Figures 3, 4, 5, 6:
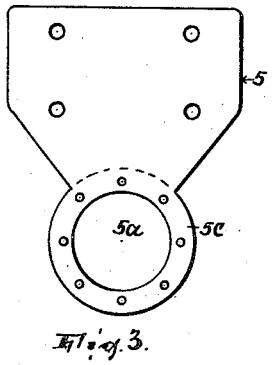
Figs. 3, 4, 5 and 6 show parts thereof.

A holder forms with said shank a support and comprises an upper or fixed member and a lower or rotatively adjustable member, both penetrated by the spindle and the lower member being adjustable on the upper member around the spindle concentric with its axis and imparting to the holder a bifurcated form. The fixed member: This comprises three laminated plates 5—5x secured to the outer face of the shank by screws 6, the plates 5 depending below the spindle and having alined circular apertures 5a and the intermediate plate 5x depending short of the spindle so that the upper member is formed bifurcated. Each of the plates 5, which are counterparts, is rabbeted at its lower portion and at its side, as at 5b, and concentrically with the aperture and for a major circumferential extent therearound it is formed as a partial annulus 5c of a diameter greater than the width of the adjoining superjacent part of the plate. The rotatively adjustable member: This comprises two counterpart plates 7 spaced the same as plates 5 and having their upper portions formed with alined circular apertures 7a. Each such upper portion is a circular disk formed concentrically of its aperture and of the same diameter as the annuli of plates 5, such diameter being appreciably greater than the width of the remaining portion or extension 7b of the plate. Said portion exists, relatively to this extension and an annular flange 7c reaching from said portion and concentric with and forming in part the surface of the aperture, as a rabbeted portion of the plate, whereby an arcuate groove is developed at 7d. The plates of the lower member exit interfitted with the respective plates of the upper member as shown in Fig. 1, or so that their apertures 7a are concentric with apertures 5a and the plates 7 have the faces thereof formed with the grooves 7d facing and abutting the outer faces of the rabbeted portions of the plates 5, the partial annuli 5c occupying the grooves. Plates 7 are held fixed to but capable of adjustment around the spindle to any angle within 90° in either direction from the depending position by screws 8 tapped into plates 5 and penetrating arcuate slots 9 in plates 7.

The spindle is usually journaled in a bushing 10 in the shank and this in this example is extended into and fits the aperture 7a of the adjoining plate 7 of the lower holder-member. Another such bushing 10a may be arranged in the aperture of the other plate 7.

In holes 7c of the extensions 7b of the lower member is journaled, parallel with the spindle, the arbor 11 of the cutter 12. The spindle and arbor have respectively fixed thereto the intermeshing gears 13—14 whereby the cutter is driven from the spindle. The cutter is here a disk having a plurality of cutters proper 12a of any suitable number. If there are more than one they all project to the same radial extent, and considering any one it is characterized by its extreme or free end being developed approximately to a point, as by said end appearing convex in this example as viewed transversely of the cutter's axis.

If the spindle penetrates the support the latter may be bifurcated, as shown, thus to receive the gearing in the resulting slot and provide substantial support for the cutter member, which is here exterior of the support so that it may precede the support in the forming of the groove.

If the rotative member of the support be adjusted to any angular position removed from the vertical the cutter will be adapted to develop a groove in the work where the latter is so held that the surface to be grooved is displaced angularly from the horizontal.

Since the support is bifurcated is affords in its slot a housing for the gearing portion of the movable part of the aforesaid system; and if it comprises two main members, one fixed and the other rotatively adjustable, interfitting substantially, as described, the support will have a compact form and the latter member will be confined to movability in only a plane perpendicular to the spindle axis.

It will be understood that the development of the groove lengthwise and with a bend or bends is, as usual, a matter of adjusting the appropriate bed or table rectilineally and horizontally and the turret rotatively; and that groove depth is attained by adjusting the work supporting means vertically.

W is the work and G the groove cut therein.

Having thus fully described my invention, what I claim is:

1. A milling machine including a frame proper and an arm projecting from and rigid with respect to the frame proper, a rotary spindle journaled in and projecting from the frame proper and having its axis parallel with the arm, and a groove-cutting system comprising structure fixed to and projecting from the arm past and penetrated by said axis, an element penetrated by said axis and rotatively adjustable around the same, a cutter member journaled in the said element on an axis parallel with the spindle, gearing connecting said spindle and member, and means to confine said element rigidly to said structure.

2. A milling machine including a frame proper and an arm projecting from and rigid with respect to the frame proper, a rotary spindle journaled in and projecting from the frame proper and having its axis parallel with the arm, and a groove-cutting system comprising structure fixed to and projecting from the arm past and penetrated by said spindle, an element penetrated by said spindle and rotatively adjustable around the same, a cutter member journaled in the said element on an axis parallel with the spindle, said element and structure together having a slot perpendicular to and penetrated by the spindle and cutter member, gearing housed in the slot and connecting the spindle and said member, and means to confine said element rigidly to said structure.

3. A milling machine including a frame proper and an arm projecting and rigid with respect to the frame proper, a rotary spindle journaled in and projecting from the frame proper and having its axis parallel with the arm, and a groove-cutting system comprising structure fixed to and projecting from the arm past and penetrated by said axis, an element confined to rotative movability in and by said structure concentrically with the spindle, a cutter member journaled in the second-named element on an axis parallel with the spindle, gearing connecting said spindle and member, and means to confine said element to said structure against rotation.

GUSTAV R. KELM.